(12) United States Patent
Mori et al.

(10) Patent No.: US 11,448,579 B2
(45) Date of Patent: Sep. 20, 2022

(54) PARTICLE SIZE DISTRIBUTION MEASURING DEVICE AND PROGRAM FOR PARTICLE SIZE DISTRIBUTION MEASURING DEVICE

(71) Applicant: HORIBA, Ltd., Kyoto (JP)

(72) Inventors: Tetsuya Mori, Kyoto (JP); Hisashi Akiyama, Kyoto (JP); Makoto Nagura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 62 days.

(21) Appl. No.: 17/059,050

(22) PCT Filed: May 27, 2019

(86) PCT No.: PCT/JP2019/020824
§ 371 (c)(1),
(2) Date: Nov. 25, 2020

(87) PCT Pub. No.: WO2019/230624
PCT Pub. Date: Dec. 5, 2019

(65) Prior Publication Data
US 2021/0310926 A1      Oct. 7, 2021

(30) Foreign Application Priority Data

Jun. 1, 2018   (JP) .............................. JP2018-106010

(51) Int. Cl.
*G01N 15/02* (2006.01)
*G01N 21/47* (2006.01)

(52) U.S. Cl.
CPC ..... *G01N 15/0211* (2013.01); *G01N 15/0205* (2013.01); *G01N 15/0227* (2013.01); *G01N 21/4788* (2013.01)

(58) Field of Classification Search
CPC ........... G01N 15/0211; G01N 15/0205; G01N 15/0227; G01N 21/4788
See application file for complete search history.

(56) References Cited

U.S. PATENT DOCUMENTS

| | | | | |
|---|---|---|---|---|
| 5,229,839 A | * | 7/1993 | Hayashi ............. | G01N 15/0205 356/336 |
| 2014/0212991 A1 | * | 7/2014 | Koshimura ...... | G01N 33/54313 422/69 |
| 2019/0353571 A1 | | 11/2019 | Mori et al. | |

FOREIGN PATENT DOCUMENTS

| | | |
|---|---|---|
| JP | 2008-164539 A | 7/2008 |
| JP | 2016-048185 A | 4/2016 |

(Continued)

OTHER PUBLICATIONS

EPO, Extended European Search Report issued in European patent application No. 19811417.5, dated Jan. 4, 2022.

(Continued)

*Primary Examiner* — Rebecca C Bryant
(74) *Attorney, Agent, or Firm* — Lucas & Mercanti, LLP

(57) ABSTRACT

A particle size distribution measuring device includes an actual spectrum obtaining unit obtaining an actual spectrum which is a light intensity spectrum; a non-target spectrum calculating unit that receives non-target particle size distribution data indicating a particle size distribution of a non-target particle group which is not a measurement target and which is accommodated in the cell and that calculates, on the basis of the non-target particle size distribution data, a non-target spectrum which is a light intensity spectrum to be obtained by irradiating the non-target particle group with light; a non-target spectrum removing unit that calculates a target spectrum which is a light intensity spectrum obtained by subtracting an influence of the non-target spectrum from the actual spectrum; and a target particle size distribution (Continued)

calculating unit that calculates the particle size distribution of the particle group which is the measurement target on the basis of the target spectrum.

7 Claims, 11 Drawing Sheets

(56) References Cited

FOREIGN PATENT DOCUMENTS

| | | | |
|---|---|---|---|
| JP | 2016048185 A | * | 4/2016 |
| JP | 2017-167081 A | | 9/2017 |
| JP | 2018-004450 A | | 1/2018 |
| WO | 2017/051149 A1 | | 3/2017 |
| WO | 2018/092462 A | | 5/2018 |

OTHER PUBLICATIONS

PCT, International Search Report for the corresponding patent application No. PCT/JP2019/020824, dated Jul. 16, 2019, with English translation.

* cited by examiner

PARTICLE SIZE DISTRIBUTION MEASURING DEVICE AND PROGRAM FOR PARTICLE SIZE DISTRIBUTION MEASURING DEVICE

CROSS REFERENCE TO RELATED APPLICATION

This Application is a 371 of PCT/JP2019/020824 filed on May 27, 2019 which, in turn, claimed the priority of Japanese Patent Application No. 2018-106010 filed on Jun. 1, 2018, both applications are incorporated herein by reference.

TECHNICAL FIELD

The present invention relates to a particle size distribution measuring device and a program used for the particle size distribution measuring device.

BACKGROUND ART

There is a light-scattering particle size distribution measuring device that irradiates with light a particle group which is a measurement target and that calculates the particle size distribution of the particle group on the basis of the light intensity spectrum of diffracted/scattered light resulting therefrom (hereinafter referred to as an actual spectrum), as disclosed in PTL 1.

A particle group irradiated with light may include not only a measurement target but also foreign substances which are not the measurement target (hereinafter referred to as a non-target particle group), and the particle size distribution measuring device is specifically configured to calculate the particle size distribution of the measurement target by subtracting the particle size distribution of the non-target particle group from the particle size distribution of an overall particle group obtained on the basis of the actual spectrum.

However, when diffracted/scattered light resulting from the non-target particle group has a great influence on the actual spectrum, the particle size distribution of the overall particle group obtained on the basis of the actual spectrum is greatly affected by the particle size distribution of the non-target particle group, and thus the particle size distribution of the particle group as the measurement target is not seen. Even if the particle size distribution of the particle group as the measurement target is seen, it is not accurate.

Thus, it is not possible to accurately calculate the particle size distribution of the measurement target by subtracting the particle size distribution of the non-target particle group from the particle size distribution of the overall particle group in the above-described manner.

CITATION LIST

Patent Literature

PTL 1: Japanese Unexamined Patent Application Publication No. 2018-4450

SUMMARY OF INVENTION

Technical Problem

Accordingly, the present invention has been made to solve the above-described problem and a main object thereof is to accurately calculate the particle size distribution of a particle group which is a measurement target even in a case where a particle group which is not the measurement target has a great influence.

Solution to Problem

A particle size distribution measuring device according to the present invention is a particle size distribution measuring device that irradiates with light a particle group which is a measurement target and which is accommodated in a cell and that calculates a particle size distribution of the particle group on the basis of a light intensity signal indicating a light intensity of diffracted/scattered light resulting from the particle group. The particle size distribution measuring device includes an actual spectrum obtaining unit that obtains an actual spectrum which is a light intensity spectrum obtained from the light intensity signal; a non-target spectrum calculating unit that receives non-target particle size distribution data indicating a particle size distribution of a non-target particle group which is not the measurement target and which is accommodated in the cell and that calculates, on the basis of the non-target particle size distribution data, a non-target spectrum which is a light intensity spectrum to be obtained by irradiating the non-target particle group with light; a non-target spectrum removing unit that calculates a target spectrum which is a light intensity spectrum obtained by subtracting an influence of the non-target spectrum from the actual spectrum; and a target particle size distribution calculating unit that calculates the particle size distribution of the particle group which is the measurement target on the basis of the target spectrum.

The particle size distribution indicates the percentage (frequency) of particles having a certain particle size relative to the whole, and conceptually includes a distribution in a case where all the particle sizes are the same (a distribution indicating that only particles having a specific particle size are present).

The particle size distribution measuring device having this configuration calculates, before calculating the particle size distribution, the target spectrum by subtracting an influence of the non-target spectrum from the actual spectrum, and thus the target spectrum is the light intensity spectrum of diffracted/scattered light resulting from the particle group which is the measurement target. Thus, as a result of calculating the particle size distribution of the particle group which is the measurement target on the basis of the target spectrum, the particle size distribution of the particle group which is the measurement target can be accurately calculated even in a case where the non-target particle group has a great influence.

Preferably, the non-target particle size distribution data is obtained by using a measurement principle different from a light scattering method.

Accordingly, by utilizing advantages of various measurement principles different from the light scattering method (for example, an advantage that the particle size distribution can be accurately calculated by image processing or an advantage that the particle size distribution of small particles or large particles can be accurately calculated), the non-target particle size distribution can be accurately calculated.

According to another embodiment, the particle size distribution measuring device may further include an overall particle size distribution calculating unit that calculates an overall particle size distribution which is a particle size distribution of an overall particle group obtained from the actual spectrum; and a non-target particle size distribution specifying unit that specifies the particle size distribution of the non-target particle group on the basis of the overall particle size distribution and a particle size range outside the measurement target. The non-target spectrum calculating unit may receive, as the non-target particle size distribution data, the particle size distribution specified by the non-target particle size distribution specifying unit.

With this configuration, the particle size distribution of the non-target particle group can be specified without capturing an image of the non-target particle group or performing image processing on the captured image data, and thus the device configuration can be simplified and a measurement time can be shortened.

Preferably, the non-target spectrum calculating unit calculates the non-target spectrum by using the non-target particle size distribution data and a refractive index of the non-target particle group.

With this configuration, the refractive index of the non-target particle group is used in addition to the non-target particle size distribution data, and thus the calculated non-target spectrum can be used as the light intensity spectrum that is more likely to be obtained by irradiating the non-target particle group with light.

A program for a particle size distribution measuring device according to the present invention is a program for a particle size distribution measuring device that irradiates with light a particle group which is a measurement target and which is accommodated in a cell and that calculates a particle size distribution of the particle group on the basis of a light intensity signal indicating a light intensity of diffracted/scattered light resulting from the particle group. The program causes a computer to execute functions of an actual spectrum obtaining unit that obtains an actual spectrum which is a light intensity spectrum obtained from the light intensity signal; a non-target spectrum calculating unit that receives non-target particle size distribution data indicating a particle size distribution of a non-target particle group which is not the measurement target and which is accommodated in the cell and that calculates, on the basis of the non-target particle size distribution data, a non-target spectrum which is a light intensity spectrum to be obtained by irradiating the non-target particle group with light; a non-target spectrum removing unit that calculates a target spectrum which is a light intensity spectrum obtained by subtracting an influence of the non-target spectrum from the actual spectrum; and a target particle size distribution calculating unit that calculates the particle size distribution of the particle group which is the measurement target on the basis of the target spectrum.

With use of such a program, a function and an effect similar to those of the above-described particle size distribution measuring device can be obtained.

Advantageous Effects of Invention

According to the above-described present invention, the particle size distribution of a particle group which is a measurement target can be accurately calculated even in a case where a particle group which is not the measurement target has a great influence.

DESCRIPTION OF EMBODIMENTS

Hereinafter, a particle size distribution measuring device according to an embodiment of the present invention will be described with reference to the drawings.

Figure 1:
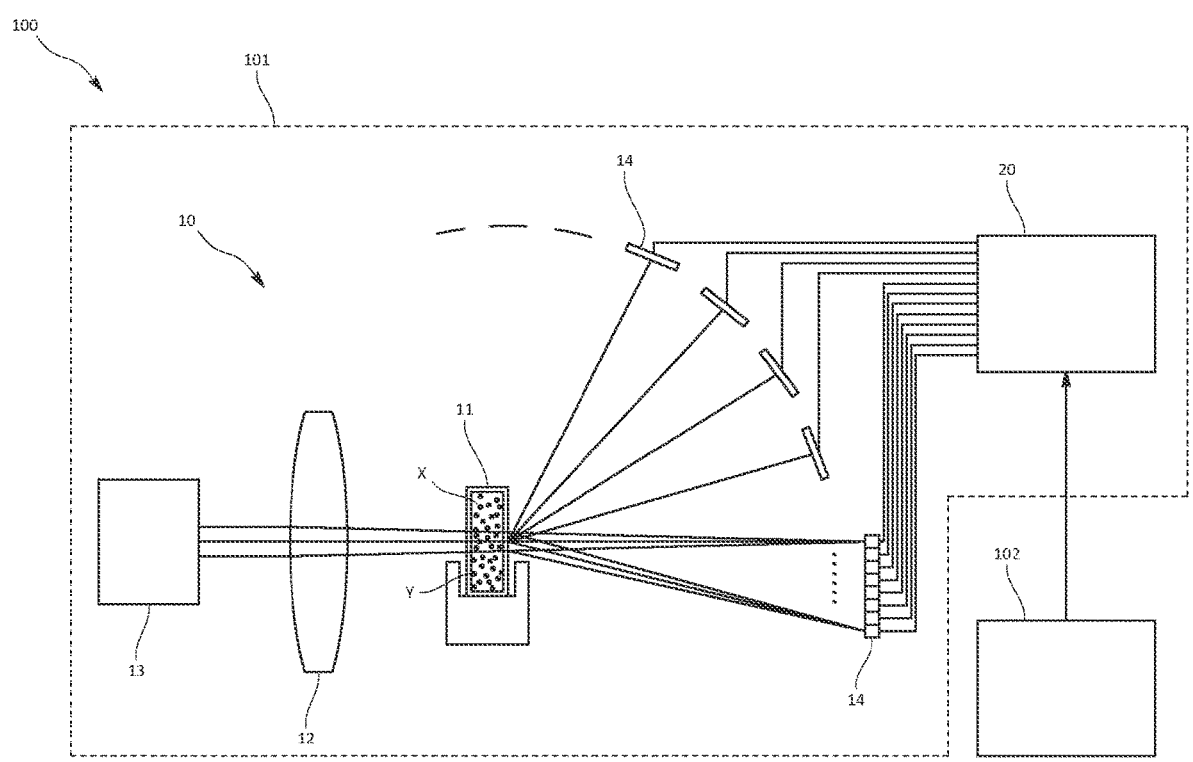
FIG. 1 is a diagram schematically illustrating an overall configuration of a particle size distribution measuring device according to a present embodiment.

As illustrated in FIG. 1, a particle size distribution measuring device 100 according to the present embodiment includes a light-scattering measuring mechanism 101 that measures a particle size distribution by using that a light intensity distribution based on the spread angle of diffracted/scattered light generated when a particle is irradiated with light is determined by the particle size on the basis of the diffraction theory and the MIE scattering theory, and by detecting the diffracted/scattered light.

The light-scattering measuring mechanism 101 includes a device main body 10 and a computing device 20.

The device main body 10 includes a cell 11 that accommodates a particle group which is a measurement target X, a laser device serving as a light source 13 that irradiates the particle group in the cell 11 with laser light via a lens 12, and a plurality of photodetectors 14 that detect the intensity of diffracted/scattered light generated by irradiation with the laser light in accordance with the spread angle. The cell 11 herein is a batch cell, and may be a circulation cell or may be of a dry type in which solid particles or liquid particles are dispersed in air.

The measurement target X may be medicine, food, or chemical industry products. The measurement target X herein is dispersed in a medium accommodated in the cell 11. Here, it is assumed that the particle group accommodated in the cell 11 includes not only the measurement target X but also particles Y which are not the measurement target X. The particles Y may be bubbles, particles having a particle size that is not to be measured, or the like.

Figure 2:
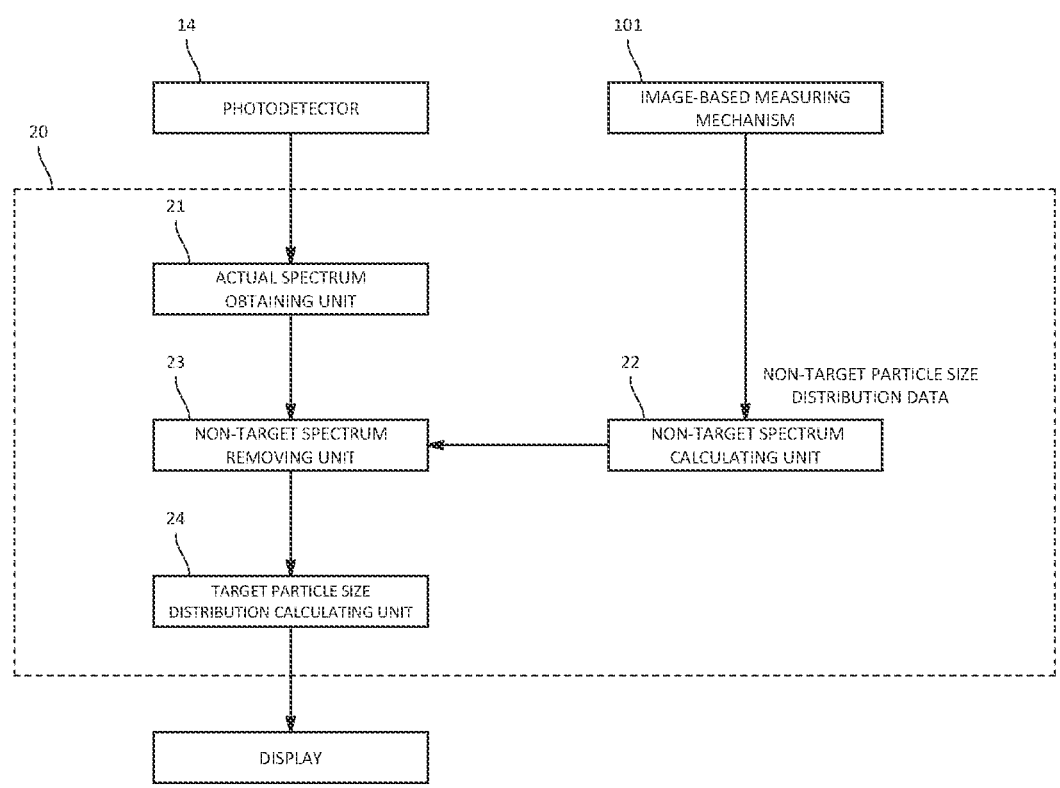
FIG. 2 is a functional block diagram illustrating the functions of a computing device according to the embodiment.

The computing device 20 is, from a physical point of view, a general-purpose or dedicated computer including a CPU, a memory, an input/output interface, and so forth, and has functions such as an actual spectrum obtaining unit 21, a non-target spectrum calculating unit 22, a non-target spectrum removing unit 23, and a target particle size distribution calculating unit 24 as illustrated in FIG. 2, the functions being implemented when the CPU and the peripheral device thereof operate in cooperation with each other in accordance with a predetermined program stored in a predetermined region of the memory.

The actual spectrum obtaining unit 21 receives light intensity signals output from the individual photodetectors 14 and obtains a light intensity spectrum corresponding to the channels of the individual photodetectors 14, that is, a light intensity spectrum corresponding to the spread angle of diffracted/scattered light (hereinafter referred to as an actual spectrum). The actual spectrum herein includes the light intensity spectrum of diffracted/scattered light resulting from a particle group which is the measurement target X and the light intensity spectrum of diffracted/scattered light resulting from a particle group which is not the measurement target X (hereinafter referred to as a non-target particle group), both the spectra overlapping each other.

The non-target spectrum calculating unit 22 calculates the light intensity spectrum of diffracted/scattered light resulting from the non-target particle group, that is, the light intensity spectrum to be obtained when only the non-target particle group is accommodated in the cell 11 and the non-target particle group is irradiated with light (hereinafter referred to as a non-target spectrum).

Specifically, the non-target spectrum calculating unit 22 receives non-target particle size distribution data indicating the particle size distribution of the non-target particle group in the cell 11 (hereinafter a non-target particle size distribution) and calculates, as a non-target spectrum, a light intensity spectrum obtained through inverse calculation using the non-target particle size distribution and the refractive index of the non-target particle group.

The non-target spectrum calculating unit 22 herein is configured to receive the non-target particle size distribution data from a second particle size distribution measuring mechanism 102 that measures a particle size distribution by using a measurement principle different from a light scattering method, as illustrated in FIG. 1 and FIG. 2. The details of the second particle size distribution measuring mechanism 102 will be described below.

Figure 3:
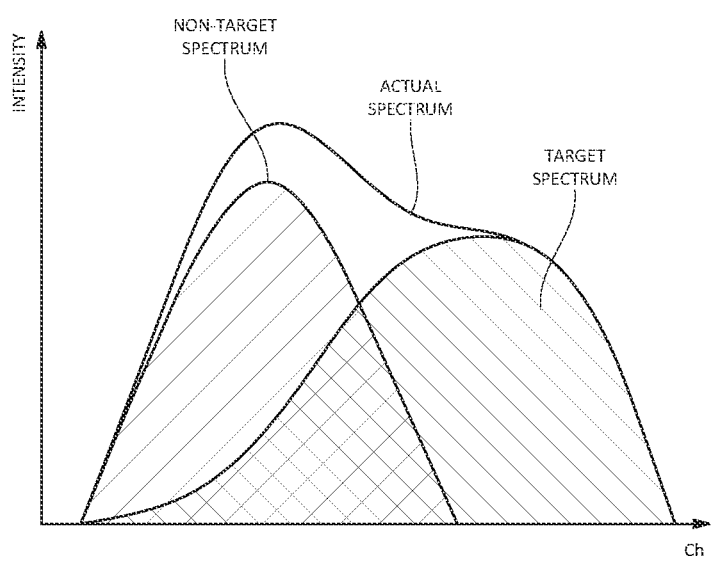
FIG. 3 is a diagram for describing the function of a non-target spectrum removing unit according to the embodiment.

The non-target spectrum removing unit 23 subtracts, from the actual spectrum, the influence of the non-target spectrum calculated by the above-described non-target spectrum calculating unit 22. Specifically, as illustrated in FIG. 3, the non-target spectrum removing unit 23 subtracts the region of the non-target spectrum from the actual spectrum to calculate the light intensity spectrum of diffracted/scattered light resulting from the particle group which is the measurement target X (hereinafter referred to as a target spectrum). The non-target spectrum removing unit 23 may calculate the target spectrum by subtracting, for example, a result obtained by weighting the region of the non-target spectrum from the actual spectrum, instead of subtracting the region of the non-target spectrum as is from the actual spectrum.

The target particle size distribution calculating unit 24 calculates the particle size distribution of the measurement target X (hereinafter referred to as a target particle size distribution) on the basis of the target spectrum calculated by the non-target spectrum removing unit 23, and displays and outputs the target particle size distribution onto, for example, a display or the like.

Figure 4:
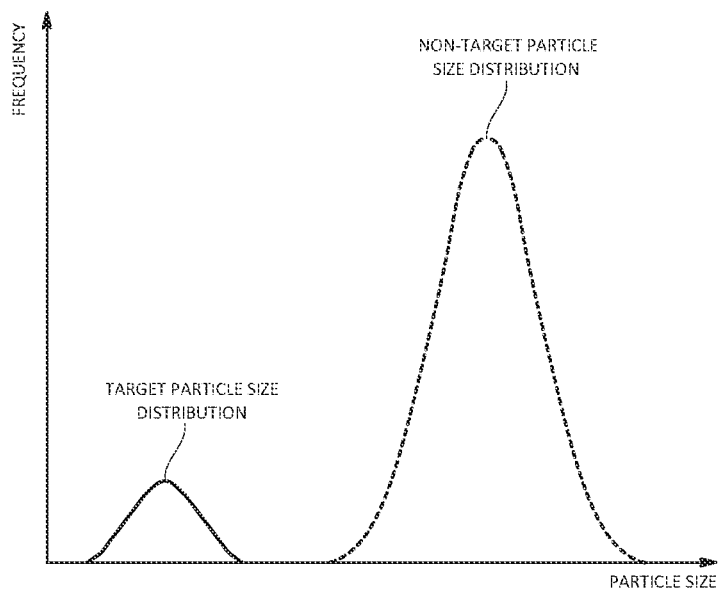
FIG. 4 is a diagram for describing the function of a target particle size distribution calculating unit according to the embodiment.

As a specific display manner, the target particle size distribution may be displayed on a graph in which one axis represents particle size and the other axis represents frequency (percentage). Only the target particle size distribution may be displayed, or the target particle size distribution and the non-target particle size distribution may be displayed in an identifiable manner as illustrated in FIG. 4, for example.

Next, the above-mentioned second particle size distribution measuring mechanism 102 will be described.

The second particle size distribution measuring mechanism 102 herein is an image-based measuring mechanism 102 that measures a particle size distribution by using an image analysis method and forms a part of the particle size distribution measuring device 100 as illustrated in FIG. 1 and FIG. 2.

The image-based measuring mechanism 102 measures the particle size distribution of a particle group which is not a measurement target for the above-described light-scattering measuring mechanism 101, that is, the non-target particle group accommodated in the cell 11, and is used here to calculate the particle size distribution of bubbles Y corresponding to the non-target particle group. Preferably, the cell 11 is identical to the one used in the measurement performed by the above-described light-scattering measuring mechanism 101. As described above, the cell 11 accommodates not only the bubbles Y but also the measurement target X for the light-scattering measuring mechanism 101.

Figure 5:
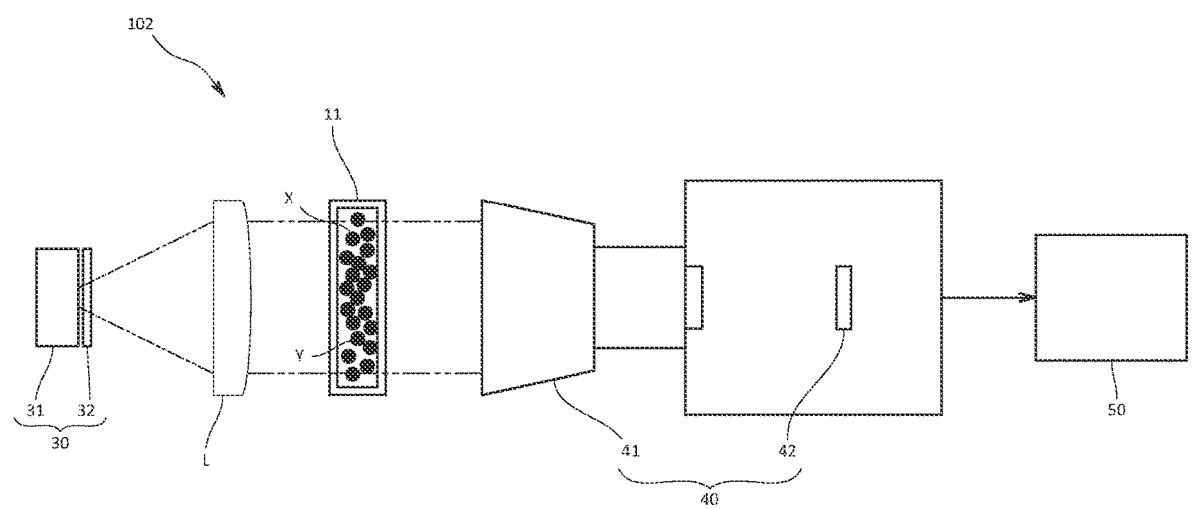
FIG. 5 is a diagram schematically illustrating an overall configuration of an image-based measuring mechanism according to the embodiment.

Specifically, as illustrated in FIG. 5, the image-based measuring mechanism 102 includes a light irradiating device 30 that irradiates the bubbles Y accommodated in the cell 11 with light, an image capturing device 40 that captures an image of the bubbles Y accommodated in the cell 11, and an image analyzing device 50 that calculates the particle size distribution of the bubbles Y on the basis of image data obtained by the image capturing device 40.

The light irradiating device 30 irradiates the particle group (bubbles Y) accommodated in the cell 11 with a light flux that spreads to a predetermined extent, and is of, for example, a surface emission type using a light emitting diode. Specifically, the light irradiating device 30 includes a light source 31 formed of a light emitting diode, and a transmission filter 32 that is provided on a light emission side of the light source 31 and that allows light having a predetermined wavelength to pass therethrough. The transmission filter 32 according to the present embodiment allows wavelengths of light received by the image capturing device 40 to pass therethrough. To obtain a precise shadow picture, it is desired to irradiate the particle group with parallel light by using parallel illumination. Although telecentric illumination is optimum, a combination of an LED light source and a condenser lens L may be used.

The image capturing device 40 includes an image capturing lens 41 and an image capturing element 42 that receives light focused by the image capturing lens 41.

The image capturing lens 41 has a focus plane in the cell 11 that accommodates the particle group. The image capturing lens 41 according to the present embodiment uses a telecentric lens. Use of the telecentric lens makes it possible to capture an image with no distortion without affected by parallax.

The image capturing element 42 receives light that has been emitted by the light irradiating device 30 and that has passed through the cell 11. The image data obtained by the image capturing element 42 is subjected to analysis processing performed by the image analyzing device 50.

Figure 6:
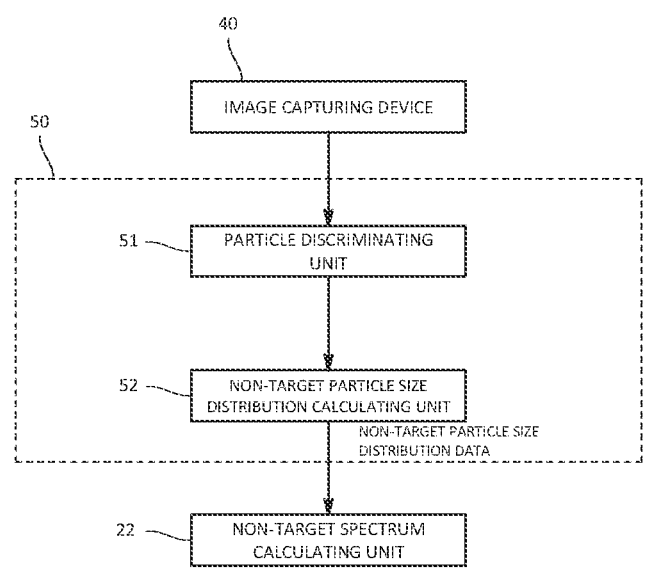
FIG. 6 is a functional block diagram illustrating the functions of an image analyzing device according to the embodiment.

The image analyzing device 50 is a general-purpose or dedicated computer including a CPU, a memory, an input/output interface, an AD converter, input means such as a keyboard or a mouse, and so forth, and has functions such as a particle discriminating unit 51 and a non-target particle size distribution calculating unit 52 as illustrated in FIG. 6, the functions being implemented when the CPU and the peripheral device thereof operate on the basis of a program stored in the memory.

Figure 7:
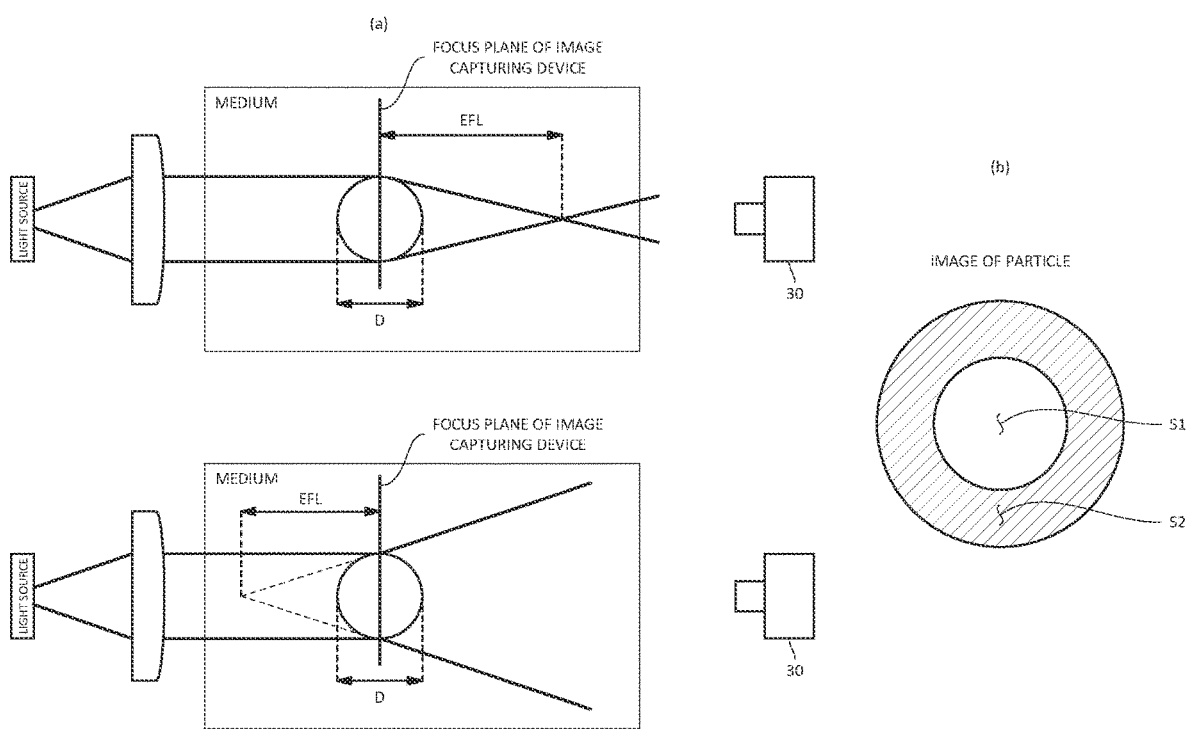
FIG. 7 includes diagrams for describing the function of a particle discriminating unit according to the embodiment.

Here, the light irradiating device 30 and the image capturing device 40 are disposed so as to face each other with the cell 11 interposed therebetween. Light emitted by the light irradiating device 30 is refracted when passing through a translucent particle, as illustrated in FIG. 7(a). More specifically, in a case where the refractive index of the particle is greater than the refractive index of the medium, the light is refracted to condense, as illustrated in the upper part of the figure. In a case where the refractive index of the particle is smaller than the refractive index of the medium, the light is refracted to disperse, as illustrated in the lower part of the figure. Accordingly, part of light radiated to the particle, specifically, the light radiated to a center portion of the particle, reaches the image capturing device 40.

As a result, an image of the particle captured by the image capturing device 40 has light and dark regions resulting from refraction of the light passing through the particle, as illustrated in FIG. 7(b). More specifically, the center portion of the particle depicted in the image is a light region (hereinafter referred to as a light region S1), and the peripheral portion thereof is a dark region (hereinafter referred to as a dark region S2). The light region S1 and the dark region S2 are identifiable regions.

In more detail, as illustrated in FIG. 7(a), in a case where a particle as the measurement target X and the bubble Y are regarded as ball lenses, a focal length EFL of each of these particles can be calculated by using the following equation, in which a diameter D of the particle, a refractive index n1 of the particle, and a refractive index n2 of the medium in which the particle disperses are parameters.

$$EFL = n1 \cdot D/4(n1-n2)$$

From the above, if an image of the measurement target X and the bubble Y whose diameters D are equal to each other is captured, the ratios, sizes, shapes, brightnesses (contrast), or the like of the light region S1 and the dark region S2 change as a result of the difference between the refractive index of the measurement target X and the refractive index of the bubble Y.

Thus, the particle discriminating unit 51 discriminates whether a particle depicted in an image is the measurement target X or a non-measurement-target, that is, the measurement target X or the bubble Y, on the basis of the above-described light region S1 and dark region S2. Specifically, the particle discriminating unit 51 is configured to discriminate whether a particle depicted in an image is the measurement target X or the bubble Y on the basis of an image difference in the light region S1 and the dark region S2, the image difference arising from the difference between the refractive index of the measurement target X and the refractive index of the bubble Y, and calculate the image difference by, for example, binarizing the image.

The particle discriminating unit 51 according to the present embodiment is configured to use the ratio of the light region S1 to the particle depicted in the image as the above-described image difference and discriminate whether the particle is the measurement target X or the bubble Y on the basis of the ratio. More specifically, the particle discriminating unit 51 is configured to discriminate whether a particle is the measurement target X or the bubble Y on the basis of the ratio of the outer diameter of the light region S1 to the outer diameter of the particle depicted in the image or the ratio of the area of the light region S1 to the area of the particle depicted in the image. The particle discriminating unit 51 determines that the particle is the bubble Y if the above-described ratio is lower than a predetermined threshold value, and determines that the particle is the measurement target X if the above-described ratio is higher than or equal to the predetermined threshold value.

The threshold value is variable according to various factors, for example, the shape or size of the cell 11, the disposition of the light irradiating device 30, the optical system of the image capturing device 40, the relative magnitudes of the refractive index of the medium and the refractive index of the particle, and so forth. Thus, the threshold value can be determined on the basis of the ratio of a light region to a bubble depicted in an image that is obtained by accommodating bubbles generated by, for example, a bubble generator or the like, in the cell 11 according to the present embodiment and capturing an image of these bubbles by using the light irradiating device 30 and the image capturing device 40 according to the present embodiment. The threshold value determined in this manner is stored in the memory of the image analyzing device 50, and therefore the particle discriminating unit 51 is capable of obtaining the threshold value from the memory and discriminating a particle.

The non-target particle size distribution calculating unit 52 calculates the particle size distribution of the non-target particle group accommodated in the cell 11, that is, the particle size distribution of the bubbles Y, as the above-described non-target particle size distribution on the basis of the image data obtained by the above-described image capturing element 42 and a result of discrimination performed by the particle discriminating unit 51. Specifically, the non-target particle size distribution calculating unit 52 calculates, for each of particles determined to be the bubbles Y by the particle discriminating unit 51, the outer diameter from the image data thereof to calculate the bubble size distribution of the bubbles Y, and outputs data indicating the particle size distribution of the bubbles Y as the above-described non-target particle size distribution data to the non-target spectrum calculating unit 22.

Figure 8:
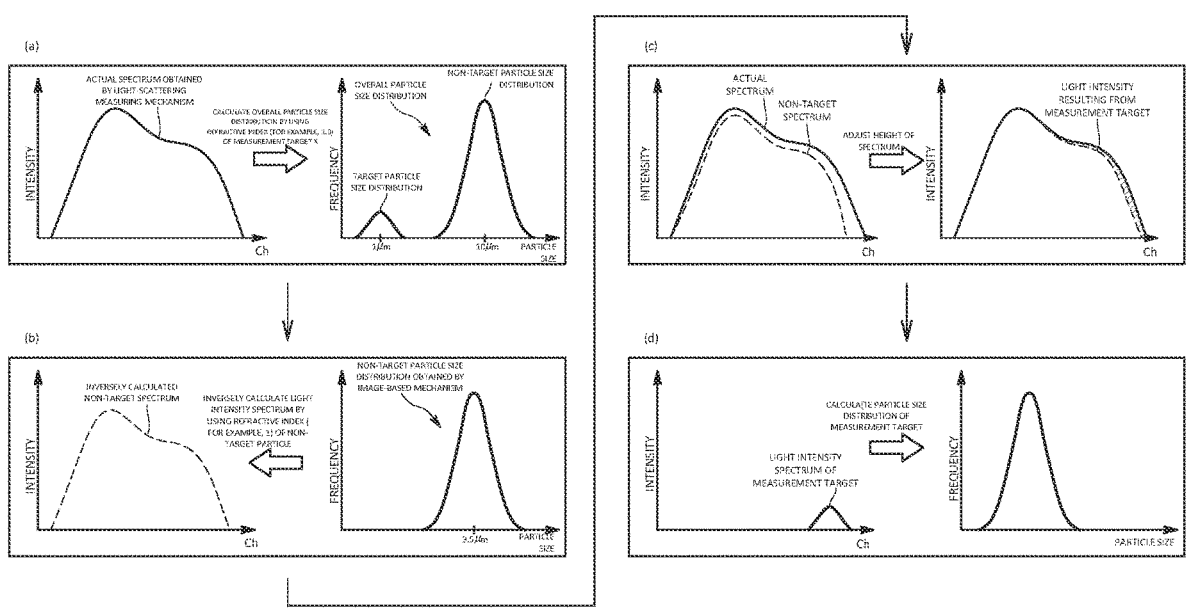
FIG. 8 includes diagrams for describing the operation of the particle size distribution measuring device according to the embodiment.

Next, a method for measuring a particle size distribution using the particle size distribution measuring device 100 according to the present embodiment will be described with reference to FIG. 8.

First, when light intensity signals detected by the plurality of photodetectors 14 of the light-scattering measuring mechanism 101 are output to the computing device 20, an actual spectrum as illustrated on the left in FIG. 8(a) is obtained.

In the case of calculating the particle size distribution of the measurement target X on the basis of this actual spectrum, the refractive index of the measurement target X is used, and an overall particle size distribution as illustrated on the right in FIG. 8(a) is obtained. Here, for convenience of description, it is assumed that, for example, the peak of the distribution resulting from the measurement target X appears at 1 μm and the peak of the distribution resulting from the non-target particle group (bubbles) appears at 10 μm.

Subsequently, as a result of measuring the particle size distribution of the non-target particle group by the image-based measuring mechanism 102, a non-target particle size distribution as illustrated on the right in FIG. 8(b) is obtained. The peak of the non-target particle size distribution (here, 9.5 μm) is different from the peak resulting from the non-target particle group appearing in the above-described overall particle size distribution (here, 10 μm). The factor for this is that the refractive index used to calculate the overall particle size distribution is not the refractive index of the non-target particle group but is the refractive index of the measurement target X.

Subsequently, a non-target spectrum is calculated from the non-target particle size distribution measured by the image-based measuring mechanism 102 by using the diffraction theory and the MIE scattering theory. The calculation is performed by using the refractive index of the non-target particle group.

Subsequently, the influence of the non-target spectrum is subtracted from the actual spectrum to calculate a target spectrum. Here, a result obtained by weighting the non-target spectrum is subtracted from the actual spectrum. Specifically, as illustrated in FIG. 8(c), the non-target spectrum is weighted such that light intensity matching is achieved in the channels opposite to the channels of the photodetectors 14 that detect diffracted/scattered light resulting from the measurement target X. That is, in a case where the particle size of the measurement target X is smaller than that of the non-target particle group as in the present embodiment, the diffracted/scattered light detected in the channel on the right side (one side) results from the measurement target X, whereas the diffracted/scattered light detected in the channel on the left side (the other side) results from the non-target particle group, and thus the entire light intensity of the non-target spectrum is multiplied by an appropriate coefficient (it may be a coefficient greater than 0 and smaller than 1 or may be a coefficient greater than or equal to 1) such that light intensity matching is achieved in the channel on the left side (the other side).

After that, the influence of the non-target spectrum is subtracted from the actual spectrum to calculate a target spectrum as illustrated on the left in FIG. 8(d), and the particle size distribution of the measurement target is calculated on the basis of the target spectrum as illustrated on the right in FIG. 8(d).

The particle size distribution measuring device 100 having this configuration calculates, before calculating a particle size distribution, a target spectrum by subtracting the influence of a non-target spectrum from an actual spectrum. The target spectrum is the light intensity spectrum of diffracted/scattered light resulting from the particle group which is the measurement target X. Thus, as a result of calculating a target particle size distribution on the basis of the target spectrum, the particle size distribution of the particle group which is the measurement target X can be accurately calculated even in a case where a non-target particle group has a great influence.

In addition, the image-based measuring mechanism 102 discriminates whether a particle depicted in an image is the measurement target X or the bubble Y on the basis of an image difference arising from the difference between the refractive index of the measurement target X and the refractive index of the bubble Y. Thus, the particle size distribution of the discriminated bubbles Y is relatively accurate. As a result, the particle size distribution of the particle group which is the measurement target X (a target particle size distribution) can be accurately calculated.

Furthermore, a result obtained by weighting a non-target spectrum is subtracted from an actual spectrum to calculate a target spectrum. In the weighting method, a weight is applied such that light intensity matching is achieved in the channels opposite to the channels of the photodetectors 14 that detect diffracted/scattered light resulting from the measurement target X. Thus, the target spectrum can be accurately calculated.

The present invention is not limited to the foregoing individual embodiments.

For example, in the foregoing embodiment, the particle size distribution of the bubbles Y is calculated by using the image-based measuring mechanism 102, and the particle size distribution of the bubbles Y is regarded as a non-target particle size distribution. Alternatively, the computing device 20 may have a function of specifying a non-target particle size distribution, as illustrated in FIG. 9.

Figure 9:
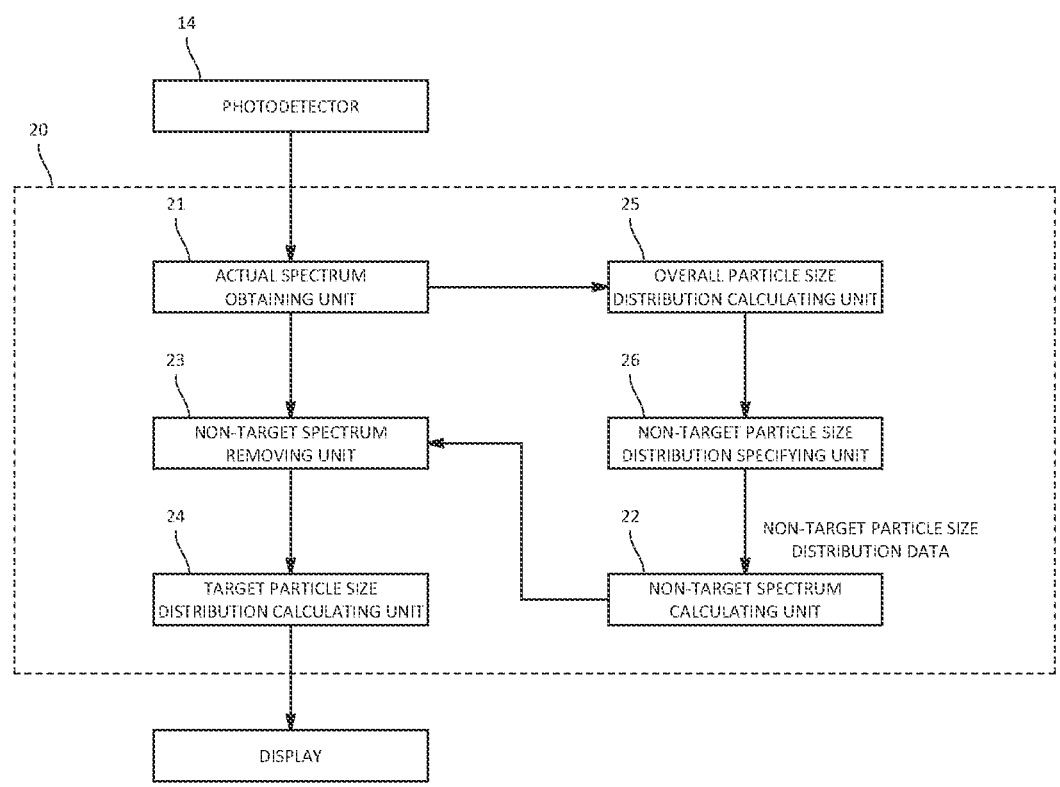
FIG. 9 is a functional block diagram illustrating the functions of the computing device according to another embodiment.

Specifically, the computing device 20 further has functions of an overall particle size distribution calculating unit 25 and a non-target particle size distribution specifying unit 26 in addition to the functions described in the foregoing embodiment, as illustrated in FIG. 9.

The overall particle size distribution calculating unit 25 calculates the particle size distribution of the overall particle group accommodated in the call 11, that is, the particle group including not only the particle group which is the measurement target X but also a non-target particle group (hereinafter referred to as an overall particle size distribution) on the basis of the actual spectrum obtained by the actual spectrum obtaining unit 21, by using the refractive index of the measurement target X here.

Figure 10:
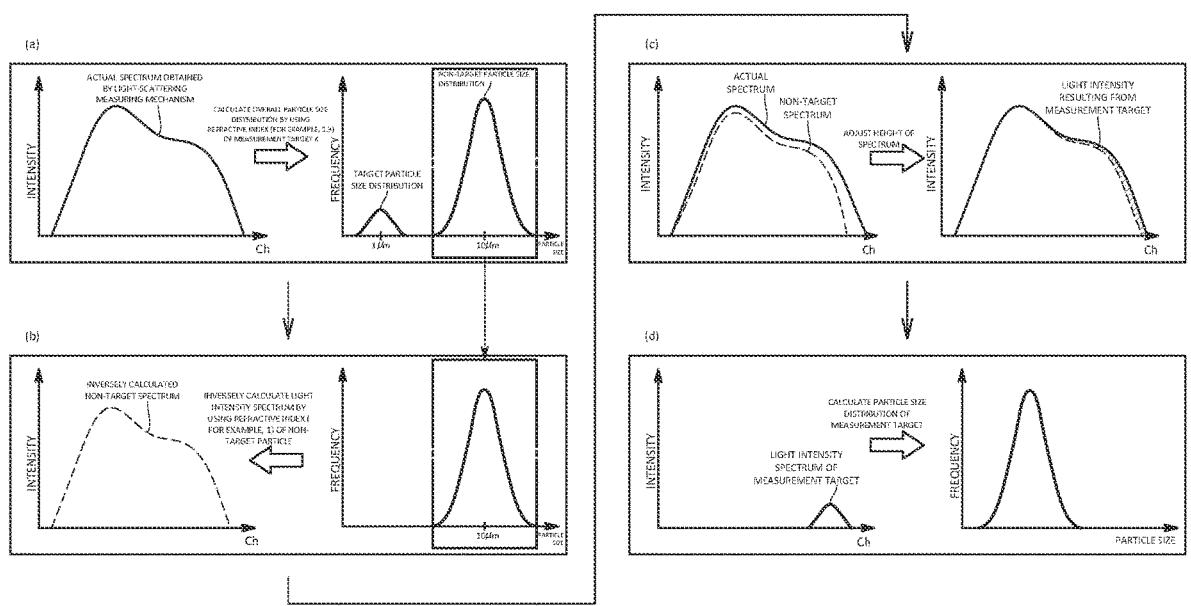
FIG. 10 includes diagrams for describing the operation of the particle size distribution measuring device according to another embodiment.
Figure 11:
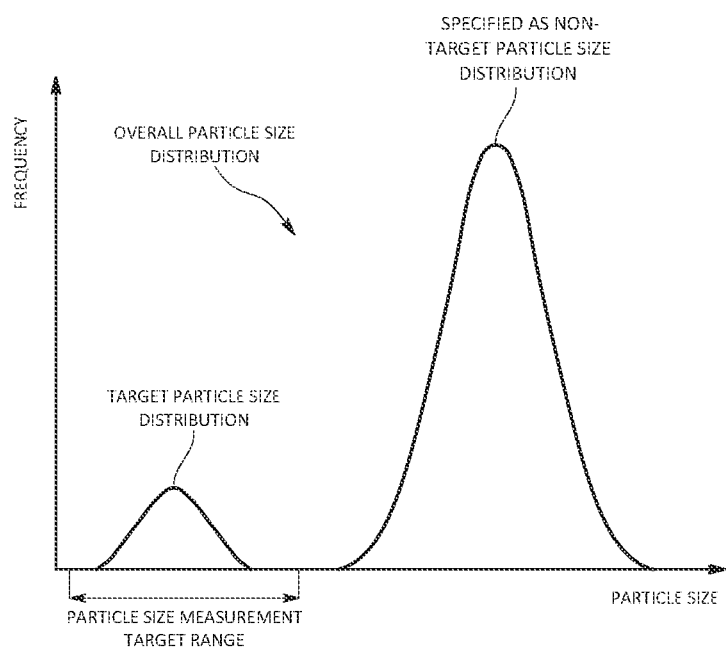
FIG. 11 is a diagram for describing the function of a non-target particle size distribution specifying unit according to another embodiment.

The non-target particle size distribution specifying unit 26 specifies the non-target particle size distribution in the overall particle size distribution calculated by the overall particle size distribution calculating unit 25. A specific specification method may be a method of setting in advance a particle size measurement target range in which a target particle size distribution, which is the particle size distribution of the measurement target X, will appear, for example, and specifying a distribution having a peak or half width outside the measurement target range as a non-target particle size distribution, as illustrated in FIG. 10 and FIG. 11. As another specification method, a distribution selected by a user from the overall particle size distribution calculated by the overall particle size distribution calculating unit 25 may be accepted and specified as a non-target particle size distribution. At this time, the user may select a specific particle size in the overall particle size distribution.

Non-target particle size distribution data indicating the non-target particle size distribution specified in this manner is output from the non-target particle size distribution specifying unit 26 to the non-target spectrum calculating unit 22. After that, as in the foregoing embodiment, a non-target spectrum is calculated on the basis of the non-target particle size distribution data, and a target particle size distribution is calculated on the basis of a target spectrum obtained by subtracting the non-target spectrum from the actual spectrum. To calculate the non-target spectrum from the non-target particle size distribution data, the refractive index used to calculate the overall particle size distribution described above, that is, the refractive index of the measurement target X, is used. To calculate the target particle size distribution from the target spectrum, the refractive index of the measurement target X is used.

With this configuration, the necessity for the image-based measuring mechanism 102 can be eliminated, and the particle size distribution of a non-target particle group can be specified without capturing an image of the non-target particle group or performing image processing on captured image data. Accordingly, the device configuration can be simplified and a measurement time can be shortened.

The particle discriminating unit 51 according to the foregoing embodiment discriminates a particle on the basis of an image difference which is the ratio of the light region S1 to the particle depicted in an image. Alternatively, the particle discriminating unit 51 may discriminate a particle on the basis of an image difference which is the size or brightness of the light region S1.

In the case of using the size of the light region S1 as an image difference, it is sufficient that the particle discriminating unit 51 be configured to discriminate a particle by comparing the size of the light region S1 with a threshold value set in advance, as in the foregoing embodiment.

In the case of using the brightness of the light region S1 as an image difference, it is sufficient that the particle discriminating unit 51 be configured to discriminate a particle by comparing the contrast (the difference from the dark region S2), luminance, or illuminance of the light region S1 with a threshold value set in advance.

Furthermore, in the image-based measuring mechanism 102, the light irradiating device 30 may be configured to irradiate a particle group with parallel light similar to that of the foregoing embodiment and irradiate the particle group with slanting light having an optical axis slanting with respect to the optical axis of the parallel light.

In this case, the particle discriminating unit 51 may be configured to identify whether a particle is the measurement target X or the bubble Y by using, as an image difference, at least one of the ratio, size, shape, disposition, or brightness of a light region that appears as a result of refraction of slanting light passing through the particle (hereinafter referred to as a second light region).

In the case of using the shape or disposition of the second light region as an image difference, association data may be stored in advance in an association data storage unit that is set in a predetermined region of the memory of the image analyzing device 50. The association data includes, for example, type information of a particle indicating whether the particle is the measurement target X or the bubble Y, and a reference pattern indicating the reference shape and reference disposition of the second light region predetermined for each type of particle, which are associated with each other. It is sufficient that the particle discriminating unit 51 be configured to compare an actual pattern indicating the actual shape or actual disposition of the second light region of a particle depicted in a captured image with the reference pattern stored as the association data, and determine the type information of the particle associated with the reference pattern closest to the actual pattern.

With this configuration, more parameters such as the ratio, size, shape, disposition, and brightness of the second light region through which slanting light has passed through can be used as an image difference, and whether a particle is the measurement target X or the bubble Y can be discriminated more correctly.

Furthermore, although both the measurement target X and the bubble Y are translucent particles in the foregoing embodiment, the particle discriminating unit 51 may discriminate a particle on the basis of whether or not the particle depicted in an image has light and dark regions, that is, the presence or absence of light and dark regions, in a case where one of the measurement target and the non-measurement-target is translucent and the other is not translucent.

In addition, although a description has been given of the case where a non-measurement-target particle is a bubble in the foregoing embodiment, the particle discriminating unit 51 may be configured to discriminate whether or not a particle is a measurement target on the basis of particle information of the particle depicted in an image in a case where a foreign substance such as a contaminant is regarded as a non-measurement-target particle. The particle information may be the shape of the particle (sphericity, aspect ratio, unevenness, or the like), the texture of the particle, or the like.

With use of the image-based measuring mechanism 102, the type of a non-measurement-target particle can be specified on the basis of particle information (shape, texture, or the like) obtained from an image. Thus, for example, the refractive index of the non-measurement-target particle can be accurately selected and a non-measurement-target particle size distribution can be calculated more accurately.

In the foregoing embodiment, a description has been given that it is preferable that the cell 11 used in the light-scattering measuring mechanism 101 be identical to the cell 11 used in the image-based measuring mechanism 102. However, if the ratio between the particle group as the measurement target and the non-target particle group accommodated in the cell 11 is within a variation that can ensure the measurement accuracy of the particle size distribution of the measurement target, the light-scattering measuring mechanism 101 and the image-based measuring mechanism 102 may use different cells 11.

The optical element according to the foregoing embodiment may be made of resin having a transmittance and an Abbe number of about 30, such as polycarbonate (PC) or polystyrene (PS), instead of a glass material.

In addition, one or some of the functions of the image analyzing device may be provided in the computing device, one or some of the functions of the computing device may be provided in the image analyzing device, and the functions of the computing device and the image analyzing device may be provided in one information processing device.

Furthermore, one or some of the functions of the foregoing embodiment may be executed by a machine learning unit that performs arithmetic processing by using a machine learning algorithm. For example, the function of the particle discriminating unit 51 may be executed by the machine learning unit. The machine learning unit performs machine learning by using a plurality of images obtained in advance, and discriminates whether the particle is the measurement target X or the bubble Y (a non-target particle) by using a result of the machine learning. Part of an image including the particle to be discriminated may be cut out from an image obtained by the image capturing device 40, and the machine learning unit may be caused to receive the part of the image as an input.

In the foregoing embodiment, the second measuring mechanism is an image-based measuring mechanism. Alternatively, the second measuring mechanism may be, for example, a measuring mechanism using a dynamic light scattering method or a centrifugal sedimentation method as a measurement principle, or a measuring mechanism using a sieve or a microscope (specifically a Raman microscope).

In addition, modifications or combinations of various embodiments may be made without deviating from the gist of the present invention.

REFERENCE SIGNS LIST

100 particle size distribution measuring device
101 light-scattering measuring mechanism
10 device main body
20 computing device
21 actual spectrum obtaining unit 22 non-target spectrum calculating unit
23 non-target spectrum removing unit
24 target particle size distribution calculating unit
102 image-based measuring mechanism
30 light irradiating device
40 image capturing device
50 image analyzing device
51 particle discriminating unit
52 non-target particle size distribution calculating unit
X measurement target
Y bubble

INDUSTRIAL APPLICABILITY

According to the present invention, the particle size distribution of a particle group which is a measurement target can be accurately measured even in a case where a particle group which is not the measurement target has a great influence.

The invention claimed is:

1. A particle size distribution measuring device that irradiates with light a particle group, which is a measurement target and which is accommodated in a cell, and that calculates a particle size distribution of the particle group on the basis of a light intensity signal indicating a light intensity of diffracted and/or scattered light resulting from the particle group, comprising:
   an actual spectrum obtaining unit that obtains an actual spectrum which is a light intensity spectrum obtained from the light intensity signal;
   a non-target spectrum calculating unit that receives non-target particle size distribution data indicating a particle size distribution of a non-target particle group, which is not the measurement target and which is accommodated in the cell, and that calculates, on the basis of the non-target particle size distribution data, a non-target spectrum which is a light intensity spectrum to be obtained by irradiating the non-target particle group with light;
   a non-target spectrum removing unit that calculates a target spectrum which is a light intensity spectrum obtained by subtracting the non-target spectrum from the actual spectrum; and
   a target particle size distribution calculating unit that calculates the particle size distribution of the particle group which is the measurement target on the basis of the target spectrum,
   wherein the non-target spectrum calculating unit calculates the non-target spectrum by using the non-target particle size distribution data and a refractive index of the non-target particle group.

2. The particle size distribution measuring device according to claim 1, wherein the non-target particle size distribution data is obtained by using a measurement principle different from a light scattering method.

3. The particle size distribution measuring device according to claim 2, further comprising an image-based measuring mechanism that measures the non-target particle size distribution data.

4. The particle size distribution measuring device according to claim 2, further comprising a non-target particle size distribution specifying unit that specifies the non-target particle size distribution data in an overall particle size distribution.

5. The particle size distribution measuring device according to claim 4, further comprising an overall particle size distribution calculating unit that calculates the overall particle size distribution based on the actual spectrum.

6. The particle size distribution measuring device according to claim 1, further comprising:
   an overall particle size distribution calculating unit that calculates an overall particle size distribution which is a particle size distribution of an overall particle group obtained from the actual spectrum; and
   a non-target particle size distribution specifying unit that specifies the particle size distribution of the non-target particle group on the basis of the overall particle size distribution and a particle size range outside the measurement target, wherein
   the non-target spectrum calculating unit receives, as the non-target particle size distribution data, the particle size distribution specified by the non-target particle size distribution specifying unit.

7. A program for a particle size distribution measuring device that irradiates with light a particle group, which is a measurement target and which is accommodated in a cell, and that calculates a particle size distribution of the particle group on the basis of a light intensity signal indicating a light intensity of diffracted and/or scattered light resulting from the particle group, the program causing a computer to execute functions of:
   an actual spectrum obtaining unit that obtains an actual spectrum which is a light intensity spectrum obtained from the light intensity signal;
   a non-target spectrum calculating unit that receives non-target particle size distribution data indicating a particle size distribution of a non-target particle group, which is not the measurement target and which is accommodated in the cell, and that calculates, on the basis of the non-target particle size distribution data, a non-target spectrum which is a light intensity spectrum to be obtained by irradiating the non-target particle group with light;
   a non-target spectrum removing unit that calculates a target spectrum which is a light intensity spectrum obtained by subtracting the non-target spectrum from the actual spectrum; and
   a target particle size distribution calculating unit that calculates the particle size distribution of the particle group which is the measurement target on the basis of the target spectrum,
   wherein the non-target spectrum calculating unit calculates the non-target spectrum by using the non-target particle size distribution data and a refractive index of the non-target particle group.

* * * * *